Patented Sept. 15, 1931

1,822,977

UNITED STATES PATENT OFFICE

FERDINAND MÜNZ, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

FATTY ACID DERIVATIVES AND PROCESS OF MAKING SAME

No Drawing. Application filed January 27, 1930, Serial No. 423,881, and in Germany February 7, 1929.

My present invention relates to new fatty acid derivatives and to a process of making same by acting with an alkylating agent on a water-soluble salt of the sulfuric acid ester of a higher fatty acid containing at least 8 carbon atoms. These starting materials are obtained in the usual manner by treating an unsaturated higher fatty or hydroxyfatty acid containing at least 8 carbon atoms with the usual sulfonating agents. As alkylating agents, dialkylsulfates, arylsulfonic acid alkylesters and alkyl- and aralkylhalides may be named, which are hereinafter referred to collectively for sake of brevity as alkylating agents.

The new products, corresponding substantially to the hypothetical formula:

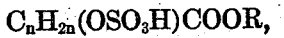

wherein $n$ means the number 8 or more and R an alkyl or aralkyl residue, are water soluble colorless to slightly colored viscous oils, having Turkey red oil like properties, but being distinguished by a remarkable degree of wetting power, particularly when compared with the corresponding compounds not esterified. Especially valuable are the compounds contaning 18 carbon atoms derived from oleic or ricinoleic acid.

In order to further illustrate my invention the following examples are given, the parts being by weight and all temperatures in centigrade degrees, but it is however to be understood, that my invention is not limited to the particular products nor reacting conditions mentioned therein.

Example 1

Oleic acid is sulfonated in the usual manner and 5 parts of the sulfonation product consisting substantially of the sulfuric acid ester of the hydroxy stearic acid of the formula:

is made up with water, to a strength of about 30 per cent of fat, (i. e., when boiled in aqueous solution with hydrochloric acid according to the usual method of analysis, an amount of water-insoluble fat is obtained corresponding to about 30% of the original weight). Then it is made alkaline by adding carbonate of soda and slowly mixed while stirring well with 1 part of diethylsulfate. The mixture is stirred for several hours at room temperature and the mass is allowed to stand for some time while warm whereby two layers are formed. After removing the salt solution, the reaction product remains as a slightly colored oil of Turkey red oil like aspect, but being distinguished by a remarkable wetting power. It may substantially correspond to the hypothetical formula:

$$C_{17}H_{34}(OSO_3H)COOC_2H_5$$

Example 2

100 parts of the sulfuric acid ester of ricinoleic acid of a strength of 40 per cent of fat are made slightly alkaline by adding borax, and at about 60–65°, 30 parts of para-toluenesulfonic acid methylester are added slowly. After stirring for some time, the layer containing the salts is removed. The remaining product corresponding substantially to the hypothetical formula:

is very similar in its properties to the product of Example 1.

Example 3

5 parts of the sulfonation product of oleic acid are made alkaline as described in Example 1 and 1 part of benzylchloride is added and the mixture is boiled for several hours in an apparatus provided with a reflux condenser, while introducing carbonic acid. The excess of benzylchloride may be removed by a steam distillation, and the salt solution is separated. The remaining reaction product corresponds substantially to the hypothetical formula:

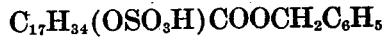

It corresponds in its properties with the products of the foregoing examples and is likewise distinguised by a good wetting power.

I claim:—

1. A process which comprises acting with an alkylating agent on a water-soluble salt of the sulfuric acid ester of a higher fatty acid containing at least 8 carbon atoms.

2. As new compounds products corresponding substantially to the hypothetical formula:

$$C_nH_{2n}(OSO_3H)COOR,$$

wherein $n$ means the number 8 or more and R a monovalent alkyl or aralkyl group consisting of carbon and hydrogen, which products are water-soluble colorless to slightly colored viscous oils, having Turkey red oil like properties but being distinguished by a remarkable degree of wetting power.

3. A process which comprises acting with an alkylating agent on a water-soluble salt of the sulfuric acid ester of a higher fatty acid containing at least 18 carbon atoms.

4. As new compounds products corresponding substantially to the hypothetical formula:

$$C_{17}H_{34}(OSO_3H)COOR,$$

wherein R means a monovalent alkyl or aralkyl group consisting of carbon and hydrogen, which products are water-soluble colorless to slightly colored viscous oils, having Turkey red oil like properties but being distinguished by a remarkable degree of wetting power.

In testimony whereof I affix my signature.

FERDINAND MÜNZ.

DISCLAIMER 1,822,977.—*Ferdinand Münz*, Frankfort-on-the-Main-Fechenheim, Germany. FATTY ACID DERIVATIVES AND PROCESS OF MAKING SAME. Patent dated September 15, 1931. Disclaimer filed March 7, 1933, by the assignee, *General Aniline Works, Inc.*

Hereby enters this disclaimer to such products as are set forth in said claims 2 and 4, except when said products are produced by the processes claimed in claims 1 and 3, respectively.

[*Official Gazette April 11, 1933.*]